United States Patent
Meszaros et al.

(10) Patent No.: US 9,168,850 B2
(45) Date of Patent: Oct. 27, 2015

(54) UTILITY SEAT ASSEMBLY

(71) Applicant: Ford Global Technologies, LLC, Dearborn, MI (US)

(72) Inventors: Edward Joseph Leonard Meszaros, Amhesrtburg (CA); David Thomas Patrick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 14/134,798

(22) Filed: Dec. 19, 2013

(65) Prior Publication Data

US 2015/0175040 A1    Jun. 25, 2015

(51) Int. Cl.
*B60N 2/02*      (2006.01)
*B60N 2/44*      (2006.01)
*B60R 5/00*      (2006.01)
B60N 2/30        (2006.01)
B60N 2/015       (2006.01)
B60R 11/00       (2006.01)

(52) U.S. Cl.
CPC ............... *B60N 2/44* (2013.01); *B60N 2/3045* (2013.01); *B60N 2/3056* (2013.01); *B60N 2/3097* (2013.01); *B60R 5/006* (2013.01); *B60N 2/01575* (2013.01); *B60N 2/01583* (2013.01); *B60N 2/3002* (2013.01); *B60N 2/305* (2013.01); *B60R 2011/0012* (2013.01); *B60R 2011/0015* (2013.01)

(58) Field of Classification Search
CPC ........ B60N 2/3002; B60N 2/305; B60N 2/36; B60N 205/35; B60N 2/01575; B60N 2/01583; B60N 2/3097

USPC ................... 297/257, 378.13, 336, 15, 378.1; 296/65.01, 69, 65.03, 65.09, 64, 24.34, 296/37.8

See application file for complete search history.

(56) References Cited

U.S. PATENT DOCUMENTS

| | | | |
|---|---|---|---|
| 7,137,663 B2 * | 11/2006 | Tsujibayashi et al. ........... | 297/15 |
| 7,393,038 B2 * | 7/2008 | Yajima et al. ............... | 296/65.03 |
| 7,490,896 B2 * | 2/2009 | Smith ........................... | 297/235 |
| 7,748,766 B2 | 7/2010 | Villeminey | |
| 7,883,146 B2 | 2/2011 | Saberan et al. | |
| 8,011,714 B2 | 9/2011 | Parkinson et al. | |
| 8,033,604 B2 * | 10/2011 | Behrens et al. ................ | 297/236 |
| 8,113,567 B2 * | 2/2012 | Yamashita et al. ......... | 296/65.03 |
| 8,336,942 B2 | 12/2012 | Yamashita et al. | |
| 8,393,677 B2 * | 3/2013 | Wieclawski ................... | 297/236 |
| 2004/0160080 A1 * | 8/2004 | Shibata et al. .................. | 296/64 |
| 2007/0013204 A1 * | 1/2007 | Yajima et al. ............... | 296/65.03 |
| 2009/0243325 A1 * | 10/2009 | Villeminey ................ | 296/65.09 |

* cited by examiner

*Primary Examiner* — Chi Q Nguyen
(74) *Attorney, Agent, or Firm* — Vichit Chea; Price Heneveld LLP

(57) ABSTRACT

A vehicle seating assembly is provided which includes a second row center seating unit including a seatback and a seat that includes a front and a rear. A slide assembly is coupled with the rear of the seat, and the seating unit is operable between a first position wherein a seat is proximate the slide assembly and a second position wherein the seat is slid forward and rotated upward such that the seatback is proximate the slide assembly. A support surface extends over the seat and is openable to expose a storage compartment when the seating unit is in the second position. A retaining feature is disposed in the front of the seat in order to secure items extending through the vehicle over the seating unit.

13 Claims, 5 Drawing Sheets

UTILITY SEAT ASSEMBLY

FIELD OF THE INVENTION

The present invention generally relates to a vehicle seating assembly, and more particularly to a utility vehicle seat configured to be operable between a plurality of positions for providing functionality and comfort to a vehicle passenger.

BACKGROUND OF THE INVENTION

Vehicles that include the utility vehicle seat increase convenience and value to the consumer.

SUMMARY OF THE INVENTION

According to one aspect of the present invention, a vehicle seating assembly is provided which includes a second row center seating unit including a seatback and a seat that includes a front and a rear. A slide assembly is coupled with the rear of the seat, and the seating unit is operable between a first position wherein a seat is proximate the slide assembly and a second position wherein the seat is slid forward and rotated upward such that the seatback is proximate the slide assembly. A support surface extends over the seat and is openable to expose a storage compartment when the seating unit is in the second position. A retaining feature is disposed in the front of the seat in order to secure items extending through the vehicle over the seating unit.

According to another aspect of the present invention, a vehicle seating assembly includes a center seating unit which includes a seat and a seatback. A slide assembly is coupled with the seat and the seating unit is operable between a first position wherein the seat is proximate the slide assembly, and a second position wherein the seatback is proximate the slide assembly. A support surface extends over the seat and is openable in order to expose a storage compartment when the seating unit is in the second position.

According to yet another aspect of the present invention, a vehicle seating assembly is provided which includes a center vehicle seat having a seat and a seatback. The center vehicle seat is configured to be removable from the vehicle. The vehicle seating assembly is operable between a first position when the seat is proximate a floor of the vehicle and a second position wherein the seatback is proximate the floor. A retention feature is disposed in the front portion of the vehicle seat and is configured to retain long cargo items over the seat.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
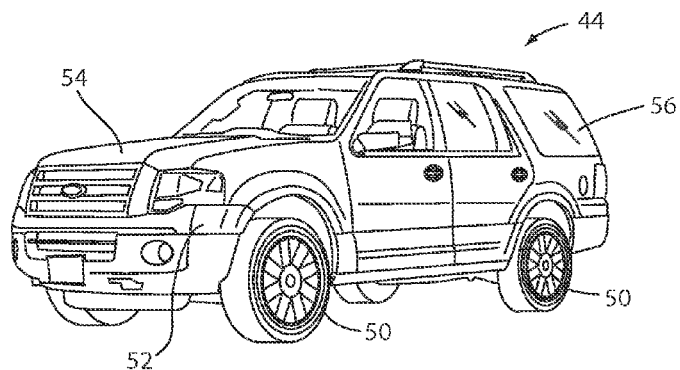
FIG. 1 is a front perspective view of a vehicle including a vehicle seating assembly according to one embodiment of the present invention.
Figure 2:
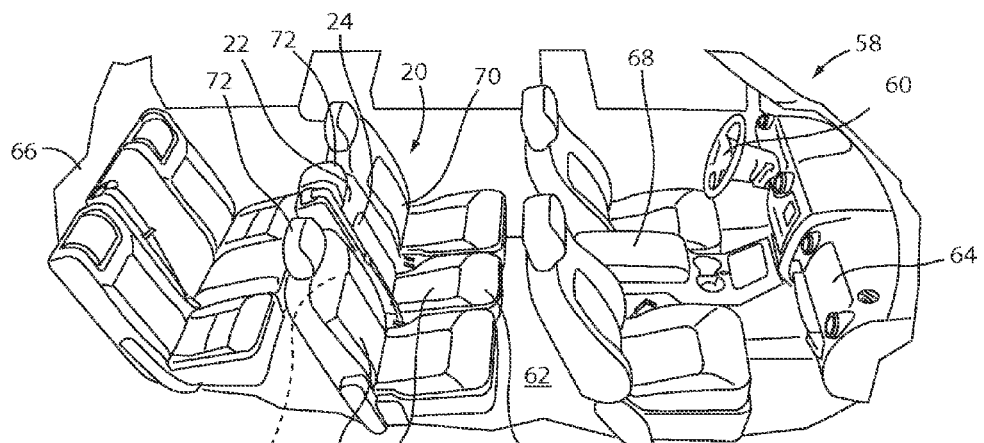
FIG. 2 is a side perspective view of an interior of the vehicle of FIG. 1 including the vehicle seating assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-11, reference numeral 20 generally designates a vehicle seating assembly 20 including a second row center seating unit 22, which includes a seatback 24 and a seat 26 having a front 28 and a rear 30. A slide assembly 32 is coupled with the rear 30 of the seat 26, and the center seating unit 22 is operable between a first position 34, wherein the seat 26 is proximate the slide assembly 32, and a second position 36, wherein the seat 26 is slid forward and rotated upward such that the seatback 24 is proximate the slide assembly 32. A support surface 38 extends over the seat 26 and is openable to expose a storage compartment 40 when the center seating unit 22 is in the second position 36. A retaining feature 42 is disposed in the front 28 of the seat 26 in order to secure items extending through a vehicle 44 over the center seating unit 22.

Referring again to FIG. 1, the vehicle 44 includes the vehicle seating assembly 20 and other features, such as multiple wheels 50, a bumper 52, a front end 54, and a rear end 56. The vehicle 44 may be of any type including a compact vehicle, a mid-size vehicle, a sport utility vehicle, a mini or full size van, or any type of truck. As illustrated in the embodiment shown in FIG. 2, an interior 58 of the vehicle 44 may include multiple vehicle seating assemblies 20. The vehicle seating assemblies 20 of the present invention may be a front vehicle seat, a rear passenger vehicle seat, or a middle passenger vehicle seat. The interior 58 of the vehicle 44 may also include other features, such as a steering wheel 60, a vehicle floor 62, a dashboard 64, a trunk 66, a center console 68 for extra storage, etc. Moreover, the interior 58 of the vehicle 44 may include multiple vehicle seating assemblies 20 such that each of a driver's seat, a front passenger seat, a second row seat or a third row seat may be vehicle seating assemblies 20, according to the present invention. However, it is also contemplated that the vehicle interior 58 may only include a single vehicle seating assembly 20, according to the present invention.

Figure 3:
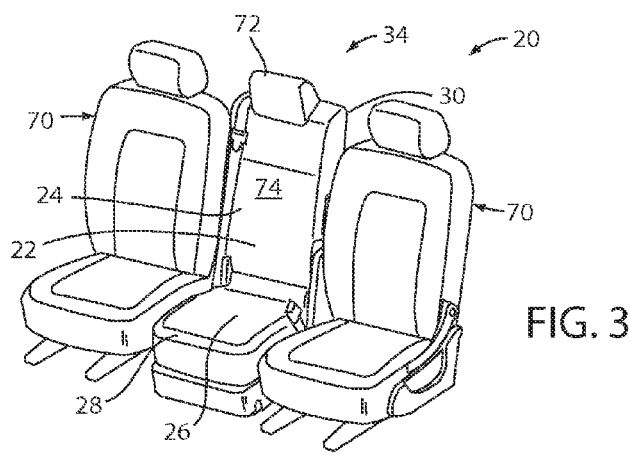
FIG. 3 is a front perspective view of the vehicle seating assembly of FIG. 1.

Referring now to the embodiment shown in FIG. 3, the vehicle seating assembly 20 includes the seat 26 and the seatback 24. The vehicle seating assembly 20 also generally includes the center vehicle seat 22 and two side seats 70 disposed on either side of the center seating unit 22. The vehicle seating assembly 20 may also include multiple headrests 72 and a coverstock 74. The coverstock 74 is generally disposed over the seatback 24 and the seat 26 or both of the side seats 70 and the center seating unit 22. The coverstock 74 is configured to provide a uniform look and feel to the vehicle seating assembly 20. Additionally, the coverstock 74 forms a passenger engagement surface on both the seatback 24 and the seat 26 of the two side seats 70 and the center seating unit 22. Moreover, the vehicle seating assembly 20, and more specifically, the center seating unit 22 may be a utility seat, which is configured to be operable in a plurality of positions, and specifically approximately at least eight positions, including at least a center occupant position 80, an armrest position 82, a passenger workspace position 84, a parent functionality position 86, a unit removability position 88, a fold flat position 90, a long item cargo position 92, and a pass through position 94.

Figure 4:
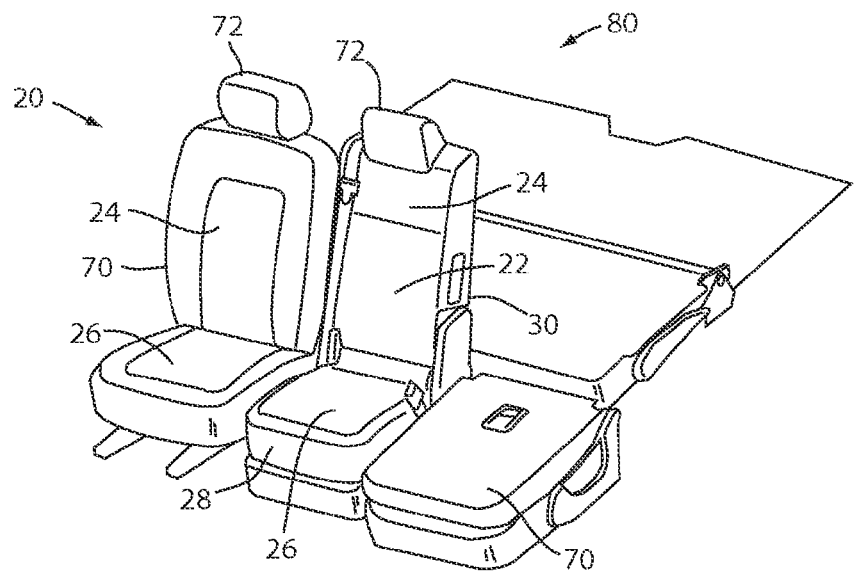
FIG. 4 is a front perspective view of the vehicle seating assembly of FIG. 1 having a center seating unit in a center occupant position.

Referring now to the embodiment shown in FIG. 4, the vehicle seating assembly 20 is illustrated in the center occupant position 80. The center occupant position 80 is a generally normal use condition having the seat 26 and the seatback 24 perpendicular to one another. As illustrated in the embodiment shown in FIG. 4, the center seating unit 22 is disposed between the two side seats 70 and is capable of moving independently of the two side seats 70. Specifically, each of the side seats 70 can be folded down or otherwise moved without affecting the position of the center seating unit 22. Additionally, the center seating unit 22 may or may not include the headrest 72. It is also contemplated that the center seating unit 22 could include a removable headrest 72 such that the headrest 72 could be easily removed when desired by the consumer. In the embodiment shown in FIG. 4, the vehicle seating assembly 20 is a second row seat disposed between the driver's seat and a third row vehicle seat 96. Additionally, the third row vehicle seat 96 is capable of folding downward until the seatback 24 is parallel and in abutting contact with the seat 26.

Figure 5:
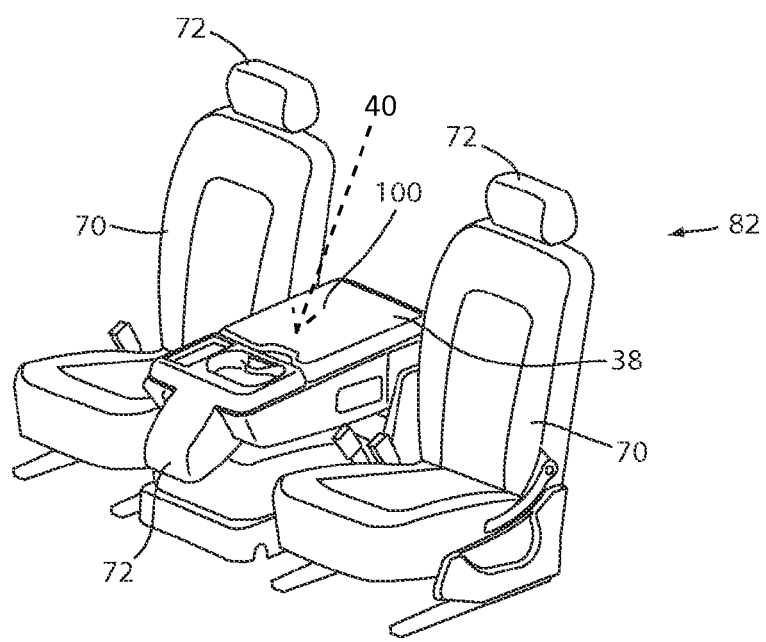
FIG. 5 is a front perspective view of the vehicle seating assembly of FIG. 1 having the center seating unit in an armrest position.

Referring now to the embodiment shown in FIG. 5, the center seating unit 22 is configured to move into the armrest position 82. In the armrest position 82, the seatback 24 is folded inward towards the seat 26 until the seat 26 and the seatback 24 are parallel and in abutting contact with one another. A back surface 100 of the center seating unit 22 may include multiple cupholders, or other inserts, for storage purposes as known by one of ordinary skill in the art. It is also contemplated that the back surface 100 of the center seating unit 22 may include the storage compartment 40, which includes the removable or hinged support surface 38. The support surface 38 extends over the storage compartment 40 and provides secure and hidden storage to the vehicle passenger. It is also contemplated that the back surface 100 of the center seating unit 22 may include a cushion portion in order to provide cushioned arm support for a vehicle passenger seated on the side seat 70. However, it is also contemplated that the back surface 100 of the center seating unit 22 may be a flat surface having no inserts or other storage features.

Figure 6:
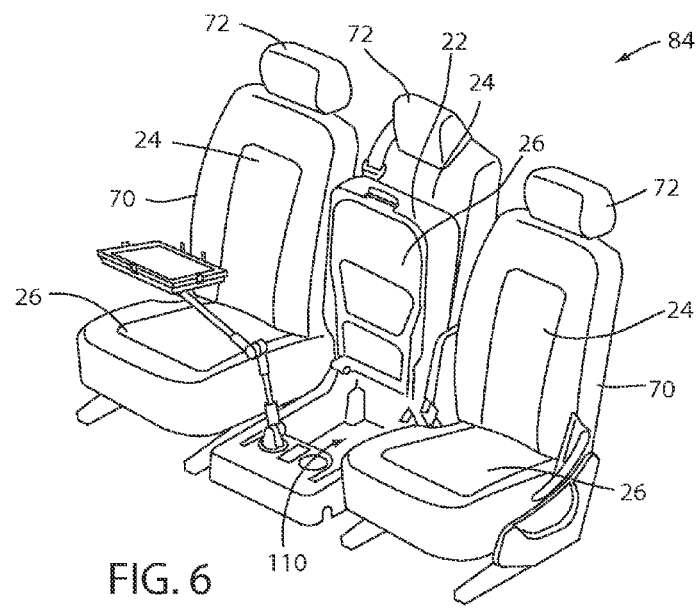
FIG. 6 is a front perspective view of the vehicle seating assembly of FIG. 1 having the center seating unit in a passenger workspace position.

Referring now to the embodiment shown in FIG. 6, the center seating unit 22 is also configured to move to the passenger workspace position 84. In the passenger workspace position 84, the seat 26 is folded upward into abutting contact and parallel with the seatback 24 to expose a passenger workspace 110. The passenger workspace 110 is a compartment disposed below the seat 26, which includes additional storage space for the vehicle passenger along with a universal serial bus (USB) and other electronic features. The electronic features may allow the vehicle passenger to charge or otherwise use a laptop or tablet device during vehicle operation. Moreover, the passenger workspace 110 may include storage space for pens, pencils, or other office supplies, along with specifically designed inserts for cell phones or other electronic devices. Additionally, the passenger workspace 110 may include a cupholder insert in order to keep liquids away from electronic devices during vehicle operation. It is also contemplated that the passenger workspace 110 may include a tray portion, which is a flat rectangular portion, parallel with the vehicle floor 62, which allows a hard surface for the vehicle passenger to write on or otherwise use. It is also contemplated that the passenger workspace 110 may be equipped with Bluetooth® capabilities or other wireless charging capability such that an electronic device may be charged or otherwise connected to the vehicle in a wireless manner. Additionally, the center seating unit 22 is generally configured to receive and support an electronic tablet style holder 111. The electronic tablet style holder 111 is configured to securely support a tablet and provide connectability via power and data ports and may also include inductive charging features.

Figure 7:
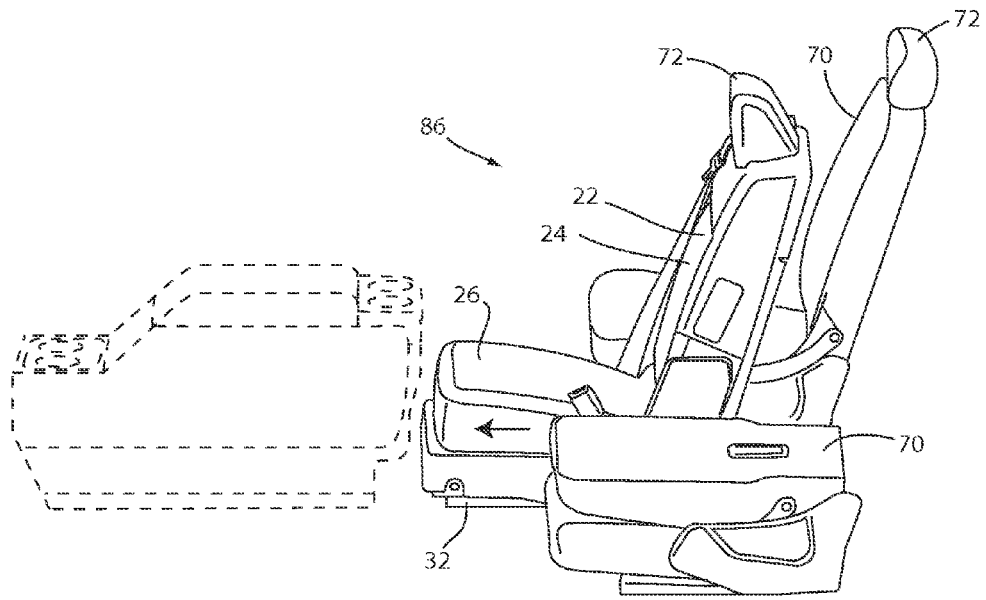
FIG. 7 is a side perspective view of the vehicle seating assembly of FIG. 1 having the center seating unit in a parent functionality position.

Referring now to the embodiment shown in FIG. 7, the center seating unit 22 of the vehicle seating assembly 20 is also configured to move into the parent functionality position 86. The parent functionality position 86 allows the center seating unit 22 to move forward towards the center console 68 of the vehicle interior 58. The slide assembly 32 is disposed below the center seating unit 22 which allows the center seating unit 22 to move forward into the parent functionality position 86 and then back into the center occupant position 80. The center seating unit 22, when in the parent functionality position 86, moves the center seating unit 22 forward up to either a first row center console or a first row center seat (approximately 300 to 400 millimeters, as shown in FIG. 7). The parent functionality position 86 allows the vehicle passenger seated on one of the side seats 70 to have easy access to a rear facing infant seat disposed on the center seating unit 22. The parent functionality position 86 also allows the vehicle passenger seated on the side seat 70 to feed or otherwise sooth an infant in a rear-facing car seat during vehicle operation. Further, the parent functionality position 86 allows easy access to the center seating unit 22 during ingress and egress in order to secure the car seat onto the center seating unit 22, without interference from the side seat 70. The parent functionality position 86 also allows easy access to a child seated in the center seating unit 22 by a vehicle passenger seated in the front passenger seat. When the center seating unit 22 is in the parent functionality position 86, the passenger seated on the front seat is able to more easily assist a child or other passenger seated on the center seating unit 22. In systems that include a front center console or a first row seat, forward travel of the center seating unit 22 into the parent functionality position 86 may be limited.

Figure 8:
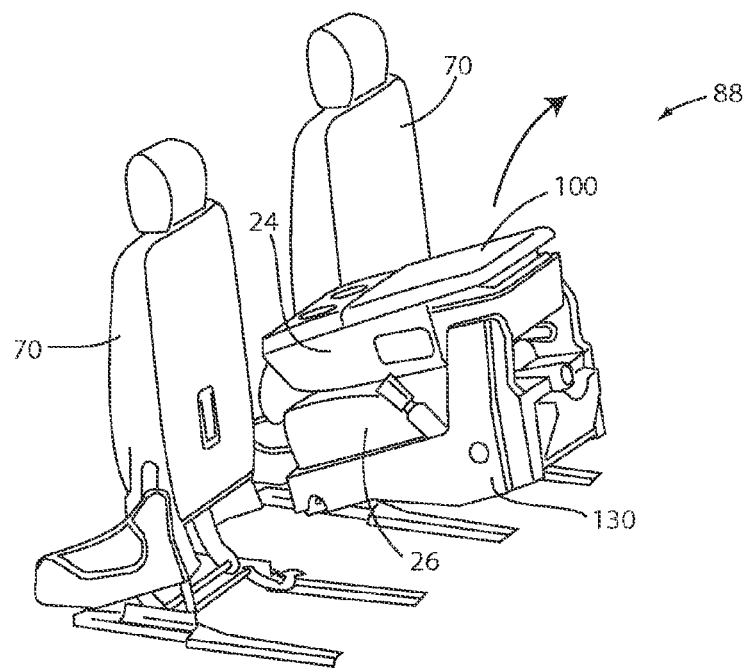
FIG. 8 is a rear perspective view of the vehicle seating assembly of FIG. 1 having the center seating unit in a unit removability position.

Referring now to the embodiment shown in FIG. 8, the center seating unit 22 of the vehicle seating assembly 20 is also configured to move into the unit removability position

88. In the unit removability position 88, the seatback 24 of the center seating unit 22 is folded downward and into abutting contact with the seat 26. The seat 26 is then configured to rock forward and allow the rear 30 of the center seating unit 22 to be removed from the slide assembly 32. The center seating unit 22 can then be picked up and removed completely from the vehicle 44. The unit removability position 88 allows easy ingress and egress between the two side seats 70, providing access to the third row of vehicle seats. Additionally, and advantageously, when the center seating unit 22 is removed from the vehicle 44, the slide assembly 32 disposed on the vehicle floor 62 will be covered by the seats 26 of the side seats 70 such that the slide assembly 32 will not be visible to the vehicle passenger when the center seating unit 22 is removed from the vehicle 44. This provides a uniform look and feel to the vehicle 44 and gives a finished look to the interior 58 of the vehicle 44 when the center seating unit 22 is removed. It is also contemplated that the center seating unit 22 may be stowed in a compartment in the interior 58 of the vehicle 44, such that the center seating unit 22 is still in the unit removability position 88. However, the center seating unit 22 remains in the interior 58 of the vehicle 44. The center seating unit 22 may be stowed in the compartment below the center seating unit 22. However, it is also contemplated that the center seating unit 22 may be stowed in a compartment disposed behind the center seating unit 22, or elsewhere in the interior 58 of the vehicle 44 such that the center seating unit 22 is not visible to the vehicle passenger.

Figure 9:
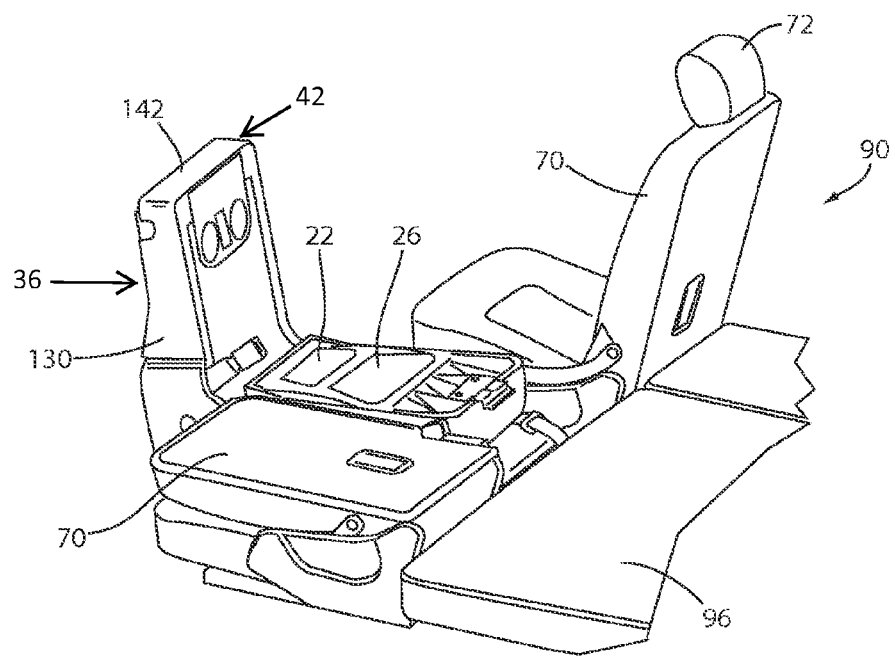
FIG. 9 is a rear perspective view of the vehicle seating assembly of FIG. 1 having the center seating unit in a fold flat position.

Referring now to the embodiment shown in FIG. 9, the center seating unit 22 is also configured to move into the fold flat position 90. In the fold flat position 90, the seatback 24 is folded downward and into abutting contact with the seat 26, similar to the embodiment illustrated in FIG. 6 corresponding to the armrest position 82. The rear 30 of the center seating unit 22 is rocked forward, similarly as described above with respect to the removability position 88. The rear 30 of the center seating unit 22 is rocked back and pushed forward until a bottom portion 130 of the center seating unit 22 is removed from the slide assembly 32 and is perpendicular to the vehicle floor 62. In the fold flat position 90, the seat 26 is on top of the seatback 24 and the seatback 24 is engaged with the slide assembly 32 to hold the center seating unit 22 in place. A cover door 132 may be disposed on the back surface 100 of the seatback 24, which provides cover and safety to any small item stowed in seatback compartments during movement to the fold flat position 90. When the center seating unit 22 is in the fold flat position 90, the back surface 100 of the seatback 24 is exposed to the vehicle passenger and includes a hard load surface extension, which provides a hard surface for the vehicle passenger to use as an armrest, or as storage for additional items. Moreover, the bottom portion 130 of the center seating unit 22, which is now facing towards a vehicle passenger seated in the side seat 70, may include cupholders or other storage features that provide additional convenience to the vehicle passenger. The bottom portion 130 provides protection to both the seat 26 and the seatback 24 while also providing standoff protection to the center console 68. This protects all high voltage alternating current (HVAC) and audio electronics from any possible cargo sliding or other load issues.

Figure 10:
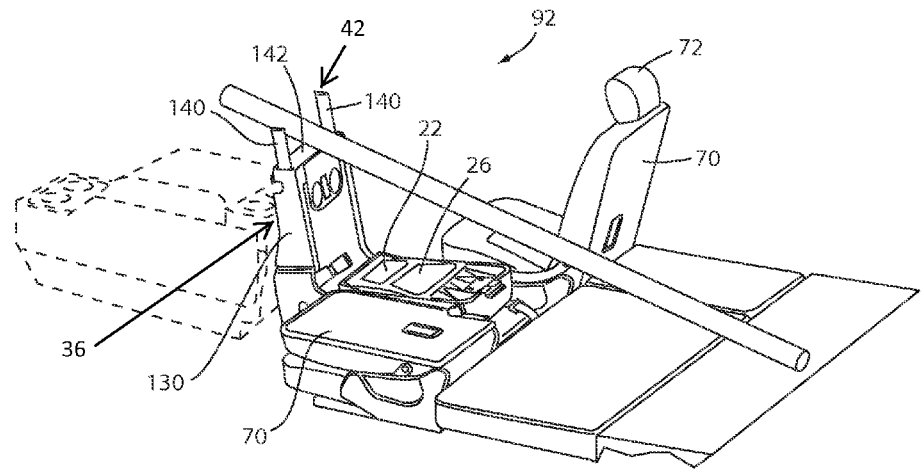
FIG. 10 is a rear perspective view of the vehicle seating assembly of FIG. 1 having the center seating unit in a long item cargo position.
Figure 11:
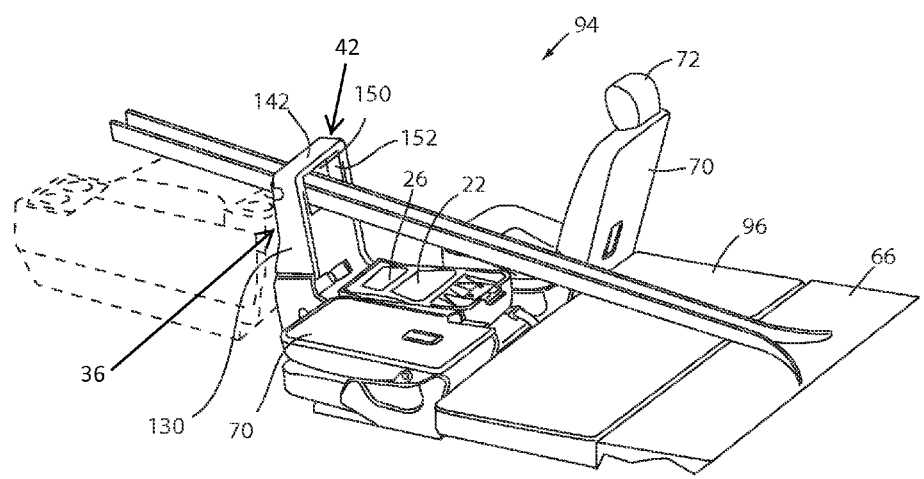
FIG. 11 is a rear perspective view of the vehicle seating assembly of FIG. 1 having the center seating unit in a pass through position.

Referring now to the embodiment shown in FIG. 10, the center seating unit 22 is also capable of being operable in the long item cargo position 92. The embodiment shown in FIG. 10 includes many of the same features as described above with respect to the embodiment illustrated in FIG. 9. Specifically, the embodiment in FIG. 10 includes the seatback 24 being folded onto the seat 26 and rocking the center seating unit 22 until the bottom portion 130 of the center seating unit 22 is removed from the slide assembly 32 and is perpendicular to the vehicle floor 62. However, as shown in the embodiment of FIG. 11, the bottom portion 130 may include at least one retention feature, which may be one of a removable cupholder portion, a storage bin, and a geometric panel. The at least one retention feature is illustrated in FIG. 10 as two sliding fences 140. The sliding fences 140 provide a secure location for long cargo, such as pieces of lumber, polyvinyl-chloride (PVC) pipe, etc. A top surface 142 of the bottom portion 130 serves as a support for the long and narrow cargo. As illustrated in the embodiment of FIG. 10, the long piece of cargo extends from the trunk 66 of the vehicle 44 and comes into abutting contact with the top surface 142 of the bottom portion 130 and then extends between the driver's seat and the front passenger seat. The sliding fences 140 are generally thin rectangular fences that may be configured to extend to multiple heights in order to accommodate varying heights and quantities of cargo. The sliding fences 140 may also be lowered such that the sliding fences 140 are not visible to the vehicle passenger. It is also contemplated that the top surface 142 of the bottom portion 130 may include friction portions that engage the cargo and prevent the cargo from sliding and moving during vehicle operation.

Referring now to the embodiment shown in FIG. 11, many of the same features as described above with respect to FIGS. 9 and 10 are again utilized. Specifically, the embodiment illustrated in FIG. 11 shows the center seating unit 22 in the fold flat position 90 as described above. However, it is also contemplated that a cupholder portion of the bottom portion 130 may be removed to define an open section 150. The open section 150 is disposed on a top section of the bottom portion 130 and provides support to cargo that may be stored in the open section 150. Specifically, long pieces of cargo, such as trim work, lumber, PVC pipe, or athletic equipment, such as skis, may be placed into the open section 150, which prevents movement of the cargo during vehicle operation. It is also contemplated that the top surface 142 of the bottom portion 130 as described above with respect to FIG. 10, a perimeter 152 of the open section 150 may include friction portions, which further secure the cargo and prevent movement of the cargo during vehicle operation. The removable cupholder portion may be stored in a compartment disposed on the exposed portion of the seatback 24, or may be completely removed from the interior 58 of the vehicle 44.

Referring again to the embodiments shown in FIGS. 4-11, the vehicle seating assembly 20 of the present invention includes the center seating unit 22 along with the two side seats 70 disposed on either side of the center seating unit 22. In operation, the center seating unit 22 is operable between at least eight positions as described above. Specifically, the center seating unit 22 is operable between the center occupant position 80, wherein the passenger is seated on the center seating unit 22, the armrest position 82, wherein the passenger seated on the side seat 70 can use the center seating unit 22 as an armrest, the passenger workspace position 84, wherein the seat 26 folds upward to expose an electronic charging station and other workstations, the parent functionality position 86, which allows the center seating unit 22 to move forward up to either a first row center console or a first row center seat (approximately between 300 and 400 millimeters, as shown in FIG. 7) to allow a parent easy access to the center seating unit 22 and consequently to a child seated on the center seating unit 22, the unit removability position 88, wherein the center seating unit 22 may be configured to be completely removable from the interior 58 of the vehicle 44, the fold flat position 90, wherein the center seating unit 22 folds downward, and the bottom portion 130 is extended, which provides protection to the center console 68 from electronic or other cargo sliding from the center seating unit 22, the long item cargo position 92 wherein the plurality of fences 140 may extend from the top surface 142 of the bottom portion 130, which provides a secure area for long item cargo, such as PVC pipe or lumber, and the pass through position 94 in which the cupholder portion of the bottom portion 130 is removed such that skis or other long cargo items may be disposed in the open section 150 left behind by the cupholder portion, providing a secure location for skis or other long cargo items. The center seating unit 22 easily moves to each of these positions, providing exceptional versatility for the passenger.

Referring to yet another aspect of the present invention, a vehicle seating assembly has a center seating unit, which is configured to be operable between a plurality of positions, including a center occupant position, an armrest position, a passenger workspace position, a parent functionality position, a unit removability position, a fold flat position, a long item cargo position, and a pass through position. Prior art vehicle seats lack versatility and functionality for the consumer. Consumers are purchasing large sport utility vehicles (SUVs) in response to a direct need for increased room, power, flexibility, and utility. The present invention provides a tangible method to satisfy a passenger's needs for flexibility and utility by providing multiple solutions and positions in a singular space, which enhance overall perceived roominess. The center seating unit can be deployed into several unique modes of operation or positions which are intended on enhancing the versatility and utility of the vehicle.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a second row center seating unit including a seatback, a seat that includes a front and a rear, the seat including a bottom portion, wherein the seatback is pivotally attached to the bottom portion;
   a slide assembly disposed within a vehicle floor and coupled with the rear of the seat proximate bottom portion, the seating unit being operable between a first position, wherein the on front of the seat is proximate the slide assembly, and a second position, wherein the seat is slid forward and rotated upward such that a back surface of the seatback is proximate the slide assembly, wherein the bottom portion is rotatable to a generally vertical position and perpendicular with the vehicle floor; and
   a retention feature disposed in the front of the seat to secure items extending through a vehicle over the seating unit when the seating unit is in the second position, wherein the retention feature is disposed within the bottom portion and includes at least one fence that is selectively extendable from the bottom portion.

2. The vehicle seating assembly of claim 1, wherein the bottom portion includes an open section configured to selectively receive a removable portion, wherein when the removable portion is removed, the open section defines the retention feature, and wherein the removable portion, when positioned within the open section, defines at least one of a cupholder portion, a storage bin, and a geometric panel.

3. The vehicle seating assembly of claim 1, wherein the first position of the seating unit is a normal use position.

4. The vehicle seating assembly of claim 1, wherein the second position includes a fold flat position allowing storage of a long cargo item.

5. The vehicle seating assembly of claim 1, wherein when the first position of the center seating unit includes a parent functionality position, defined by the center seating unit sliding forward along the slide assembly to provide access to the center seating unit by a front row vehicle passenger.

6. The vehicle seating assembly of claim 5, wherein when the center seating unit is in the parent functionality position, the center seating unit is moved forward in the vehicle into close proximity with one of a first row center console and a first row center seat.

7. The vehicle seating assembly of claim 1, wherein the center seating unit is configured for toolless removal from the vehicle.

8. The vehicle seating assembly of claim 7, wherein when the center seating unit is removed from the vehicle, a slide assembly is not visible to a vehicle passenger.

9. A vehicle seating assembly comprising:
a toolessly-removable center seating unit having a seat and a seatback,
the center seating unit being rotationally operable between a first position, wherein the seat is proximate a vehicle floor, and a second position, wherein the seatback is proximate the vehicle floor; and
a retention fence extendable from in a front portion of the seat for retaining long cargo items over the seat when in the second position.

10. The vehicle seating assembly of claim 9, wherein the center seating unit is configured to slide forward along a sliding assembly disposed within the vehicle floor to provide access to the center seating unit by a front row vehicle passenger, wherein the sliding assembly is at least partially disposed under an adjacent vehicle seat.

11. The vehicle seating assembly of claim 10, wherein when the center seating unit is in a parent functionality position, the center seating unit is moved forward in the vehicle along the sliding assembly and into close proximity with one of a first row center console and a first row center seat.

12. The vehicle seating assembly of claim 10, wherein the front portion of the seat includes an open section configured to receive an accessory portion, wherein when the accessory portion is removed from the open section, the open section defines the retention feature, and wherein the accessory portion includes at least one of a removable cupholder, a storage bin, and a geometric panel.

13. The vehicle seating assembly of claim 12, wherein when the center seating unit is removed from the vehicle, the slide assembly is not visible to a vehicle passenger.

* * * * *